(12) United States Patent
Maynard et al.

(10) Patent No.: US 6,442,664 B1
(45) Date of Patent: Aug. 27, 2002

(54) COMPUTER MEMORY ADDRESS TRANSLATION SYSTEM

(75) Inventors: Ann Marie Maynard, Austin, TX (US); Brian Chase Twichell, Epping (AU)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/323,395

(22) Filed: Jun. 1, 1999

(51) Int. Cl.[7] .......................... G06F 12/10; G06F 12/16
(52) U.S. Cl. ........................... 711/203; 711/210
(58) Field of Search ............................. 711/207, 208, 711/210, 204, 205, 213, 221, 202, 203

(56) References Cited

U.S. PATENT DOCUMENTS

| | | | | |
|---|---|---|---|---|
| 4,604,688 A | * | 8/1986 | Tone | 711/207 |
| 5,249,276 A | * | 9/1993 | Honmura et al. | 711/207 |
| 5,832,205 A | * | 11/1998 | Kelly et al. | 711/204 |
| 5,895,501 A | * | 4/1999 | Smith | 711/207 |
| 5,930,833 A | * | 7/1999 | Yoshioka et al. | 711/141 |
| 6,041,396 A | * | 3/2000 | Widigen | 711/206 |

* cited by examiner

Primary Examiner—Matthew Kim
Assistant Examiner—Matthew D. Anderson
(74) Attorney, Agent, or Firm—Casimer K. Salys; Bracewell & Patterson, L.L.P.

(57) ABSTRACT

A memory translation system which includes an "address cache" (addrcache). This address cache contains translation information of recently referenced addresses, and is accessed before the conventional two-level address translation process. If a hit is made in the address cache, which does not require protection checking, the conventional address translation process is bypassed. The address cache stores its memory addresses according to the protection status of each address, so that protection checking is not performed as a separate step.

6 Claims, 5 Drawing Sheets

COMPUTER MEMORY ADDRESS TRANSLATION SYSTEM

BACKGROUND OF THE INVENTION

1. Technical Field

The present invention generally relates to computer memory and in particular to computer memory addressing techniques. Still more particularly, the present invention relates to a system and method for improved memory address translations with protection checking.

2. Description of the Related Art

In today's computer systems, the system memory is managed by the operating system, and is allocated to different software applications as needed. Virtual memory is a technique by which a relatively smaller amount of physical memory can be made to seem larger and shareable among many processes. Each software application therefore deals with "effective" addresses in a virtual memory space, which allow the application to read, write, and execute when required, without ever being concerned with the actual locations, in physical or disk memory, where the operations are taking place. The application relies on the operating system to perform the mapping from the effective address to a physical address.

Address Translation

Address translation is the mechanism by which effective addresses generated by the CPU to access virtual memory are translated into real memory addresses. Address translation is a complex procedure that, if not implemented well, can end up on the critical path determining the clock cycle of the processor. This is true for all architectures, and more so for architectures requiring a two-level process to translate addresses.

Referring now to FIG. 4, a flowchart of a conventional two-level address translation process is shown. To translate an address using two-level address transaction, an effective address must be first translated into an interim virtual address using segment information, and then into a physical address using page table information. Both translation phases require checking of protection bits which dictate the types of accesses that are allowed (e.g. read, write, read and write, no-execute).

In this Figure, when the CPU requests an effective address (step 400), the system first checks the Segment Registers (SR) and Segment Lookaside Buffers (SLB) to determine a virtual address corresponding to the effective address (step 410). In doing so, the system must also perform protection checking to be sure that the type of access requested by the process is permitted (step 420). Note that the various caching structures mentioned here are described more fully below. This process produces a virtual address, if protection checking passes, else an error is returned.

Next, the virtual address is used to access the Translation Lookaside Buffer to determine the correct page table and physical address corresponding to the virtual address (and thereby to the effective address) (step 430). Once again, the system must also perform protection checking to be sure that the type of access requested by the process is permitted (step 440). Finally, if protection checking passes, a valid physical address is returned to the CPU process (step 450).

With reference now to FIG. 5, an example of the use of page tables for address translation is shown. In this figure, both virtual memory 515/525 and physical memory 500 are divided up into multiple "pages," each of which are typically the same size. Each of these pages is given a unique Page Frame Number (PFN indicating a Page Frame Number in physical memory, VPFN indicating a Page Frame Number in virtual memory). For every instruction in a program, e.g., to load a register with the contents of a location in memory, the CPU performs a mapping from a virtual address to a physical one. Also, if the instruction itself references memory then a translation is performed for that reference.

The address translation between virtual and physical memory is done by the CPU using page tables which contain all the information that the CPU needs. Typically, there is a page table for every process in the system. FIG. 5 shows a simple mapping between virtual addresses and physical addresses using page tables for Process X 525 and Process Y 515.

In this example, Process X's virtual PFN 0, shown in the virtual memory 525 for Process X, is mapped into memory in physical PFN 1, using Process X's page tables 520. Process Y's virtual PFN 1, shown in the virtual memory 515 for process X, is mapped into physical PFN 4, using Process Y's page tables 510.

Each entry in the page tables 510/520 contains the following information:

The virtual PFN,

The physical PFN that it maps to, and

Protection (access control) information for that page.

To translate a virtual address into a physical one, the CPU must first work out the addresses virtual PFN and the offset within that virtual page. The CPU then searches the process's page tables for an entry which matches the virtual PFN. This gives us the physical PFN for which we are looking.

The CPU then takes that physical PFN and multiplies it by the page size to get the address of the base of that page in physical memory. Finally, the CPU adds in the offset to the instruction or data that it needs.

By mapping virtual to physical addresses this way, the virtual memory 515/525 can be mapped into the system's physical pages 500 in any order. For example, in FIG. 5, Process X's VPFN 0 is mapped to physical PFN 1 whereas VPFN 7 is mapped to physical PFN 0 even though it is higher in virtual memory than virtual PFN 0. Therefore, the pages of virtual memory do not have to be present in physical memory in any particular order.

Unlike typical user-level programs, Database and Transaction Processing applications that run in Server and PC Server environments have large memory requirements. Database workloads touch a large number of distinct pages in memory, which places high demands on the address translation mechanism to access them.

Caching Techniques

To enhance system performance, particularly in relation to memory, several different types of memory caches may be used. These include a page cache, which is used to speed up access to images and data in a virtual memory which is stored on a disk. As pages are read into memory from disk they are cached in the page cache. If they were discarded and then needed again they can quickly be fetched from this cache.

Pages may contain data buffers being used by the kernel, device drivers and so on. The buffer cache is a look aside list of buffers. If, for example, a device driver needs a 256 byte buffer, it is quicker to take a buffer from the buffer cache than to allocate a physical page and then break it up into 256 byte buffers.

When a system utilizes a disk-based virtual memory, this memory is generally stored in a "swap file." To save time in storing data in a swap file (which is much slower than RAM), many systems use a "swap cache,", so that only written (or dirty) pages are saved in the swap file. So long as these pages are not modified after they have been written to the swap file, then the next time the page is swapped out there is no need to write it to the swap file as the page is already in the swap file. Instead the page can simply be discarded. In a heavily swapping system this saves many unnecessary and costly disk operations.

One commonly implemented hardware cache is in the CPU; a cache of Page Table Entries. In this case, the CPU does not read the page table directly but instead caches translations for pages is it needs them. These are the Translation Look-aside Buffers and contain copies of the information kept in the operating system's page table. When the reference to the virtual address is made, the CPU will attempt to find a matching TLB entry. If it finds one, it can directly translate the virtual address into a physical one and perform the correct operation on the data. If the CPU cannot find a matching TLB entry then it must get the operating system to help. It does this by raising an exception. In essence this means signaling the operating system that a TLB miss has occurred.

Other performance-enhancing hardware features include Segment Registers (SRs), as well as small, fast caches called Segment Lookaside Buffers (SLBs). SRs and SLBs hold recently used segment table entries and are searched to provide necessary information for the effective-to-virtual address translation process.

These mechanisms enhance performance of the address translation process. The drawback of using caches, hardware or otherwise, is that the system must use more time and space maintaining these caches, and if the caches become corrupted, then the system will crash. Furthermore, these type of caches do not eliminate the need for protection checking.

Protection Checking

Protection checking refers to the process of verifying that the requested type of memory access is permitted. Each entry may be marked, for example, "no execute" or "read-only." The operating system must check memory access against the protection information for that address to be sure that the memory access (whether read, write, or execute) may be performed. Because each access must be checked, any amount of traditional caching can only provide a limited improvement in memory access time, as the protection checking becomes a bottleneck. There is therefore a need for an efficient means for virtual memory access and address translation with an improved system for protection checking.

SUMMARY OF THE INVENTION

It is therefore one object of the present invention to provide an improved computer memory.

It is another object of the present invention to provide an improved computer memory addressing system.

It is yet another object of the present invention to provide an improved system and method for memory address translations with protection checking.

The foregoing objects are achieved as is now described.

A memory translation system is provided which includes an "address cache" (addrcache). This address cache contains translation information of recently referenced addresses, and is accessed before the conventional two-level address translation process. If a "hit" is made in the address cache, which does not require protection checking, the conventional address translation process is bypassed. The address cache stores its memory addresses according to the protection status of each address, so that protection checking is not performed as a separate step.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
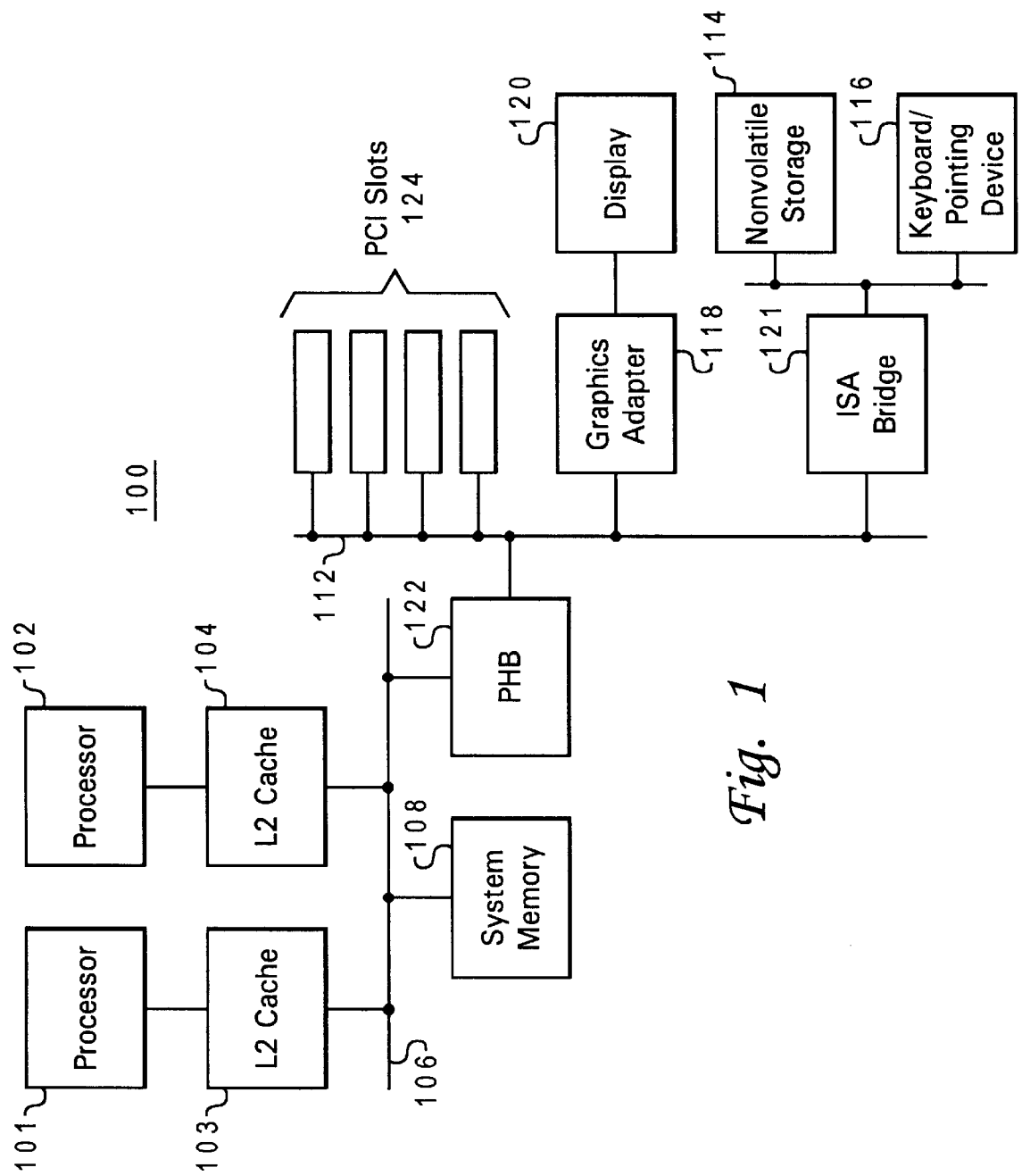
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, N.Y. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD)

drive, a sound card and audio speakers, and numerous other optional components. All such variations are believed to be within the spirit and scope of the present invention. Data processing system 100 and the exemplary flowcharts below are provided solely as examples for the purposes of explanation and are not intended to imply architectural limitations.

The preferred embodiment includes an "address cache" (addrcache). Like the traditional caches described above (SLBs, TLBs) this address cache contains translation information of recently referenced addresses. However, the preferred embodiment is different in that it resides before the two-level address translation process and bypasses this mechanism, and its protection checking overhead, whenever possible.

Figure 2:
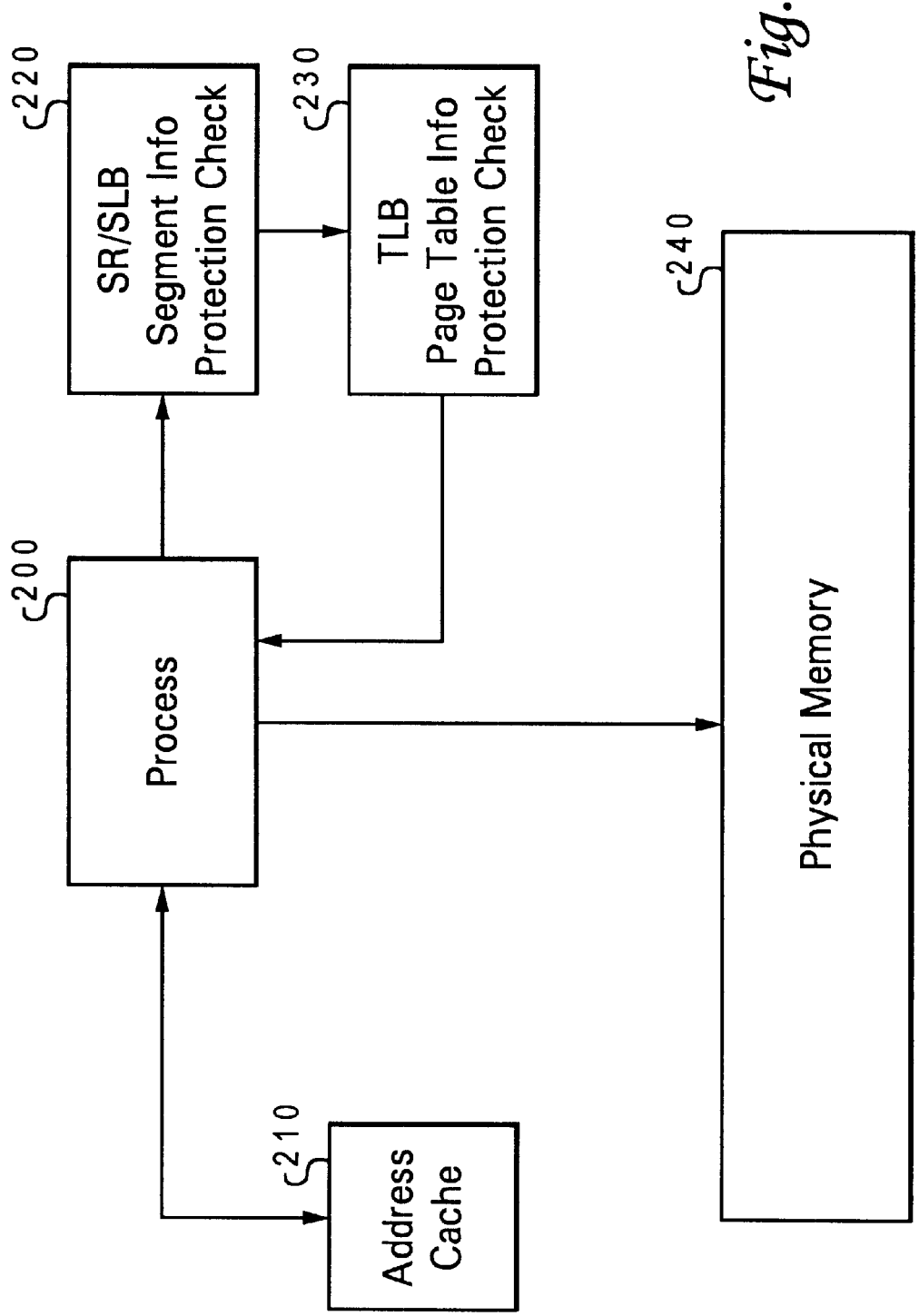
FIG. 2 depicts a block diagram of an address translation system in accordance with a preferred embodiment of the invention.

With reference now to FIG. 2, a block diagram of the disclosed address cache system is shown. When a process 200 requests an address, the virtual address requested must be translated to a physical address. The system first requests the address translation from address cache 210. If the request "hits" here, the effective address is returned from address cache 210 to process 200, and the access to physical memory 240 is completed.

If the translation information for the requested effective address is not found in the address cache 210, the normal two-level address translation process is executed, along with the required protection checks. First, the SR/SLB 220 is checked for segment information, and the memory protection information is checked. Then the TLB 230 is checked for page table information, and memory protection information is again checked. Finally, when the translation is complete and returned to process 200, translation information is stored in the address cache 210 to speed up translation next time.

According to the preferred embodiment, the translation information is not put into the address cache unless it is determined to be "safe" from potential protection violations. Therefore, the disclosed caching technique can not only realize a performance gain by bypassing the lengthy two-level translation process, but also eliminates the performance loss due to the overhead of protection checking by bypassing the protection checking requirements.

According to the preferred process, a candidate into the address cache is considered safe from potential protection violations if an instruction reference is readable and does not reside in an area of memory marked as "no-execute," or if a data reference is both readable and writeable.

Further, the address caches for instructions and data are separated, to efficiently accommodate the distinct "safe" requirements for instructions and data. The data address cache can further be split to distinguish between loads and stores, since only a store request requires that an access be both readable and writeable.

The address cache arrays are quickly searched for the requested real address information using a commonly used hash function that implements a direct-mapped search. The components of the address cache include:

virtual page information (VSID+page) to verify the correct virtual page has been found;

VirtualPage is made up of VSID_unshifted and PageIndex the real page number (RPN), for quick access/calculation of the physical address a pointer to actual the page table entry (PTE) for quick modification of change and reference bits To avoid program execution and system errors, the address caches are flushed appropriately whenever TLBs and SLBs are typically flushed in any conventional system.

In the preferred embodiment, the address cache comprises separate instruction and data caches, each having 512 entries. These caches each contain translation information of recently referenced addresses.

The following pseudo-code defines data structures in accordance with the preferred embodiment of the invention.

```
/* structures for address translation "caches" for
simulation speedup
        - separate I/D array of pointers to recently used
"safe" PTEs */
    struct {
        struct {       /* Virtual Page = VSID + PAGE */
            uint64 VSID_unshifted;
            uint16 PageIndex_shifted;
        } VirtualPage;
        uint64 RPN;
        PA ptep;
    } iaddrcache [512];
    struct {
        struct {       /* Virtual Page = VSID + PAGE */
            uint64 VSID_unshifted;
            uint16 PageIndex_shifted;
        } VirtualPage;
        uint64 RPN;
        PA ptep;
    } daddrcache [512];
```

These arrays are searched for requested PTE using any efficient hash function, well known in the art and familiar to those of ordinary skill in the art. By way of example, one such hash function uses direct mapped hashing, which for 512 array requires 9 bits of addr: hash_addr_9 bit=[EA (36:39) xor EA(43:46)] cat EA(47:51)

Figure 3:
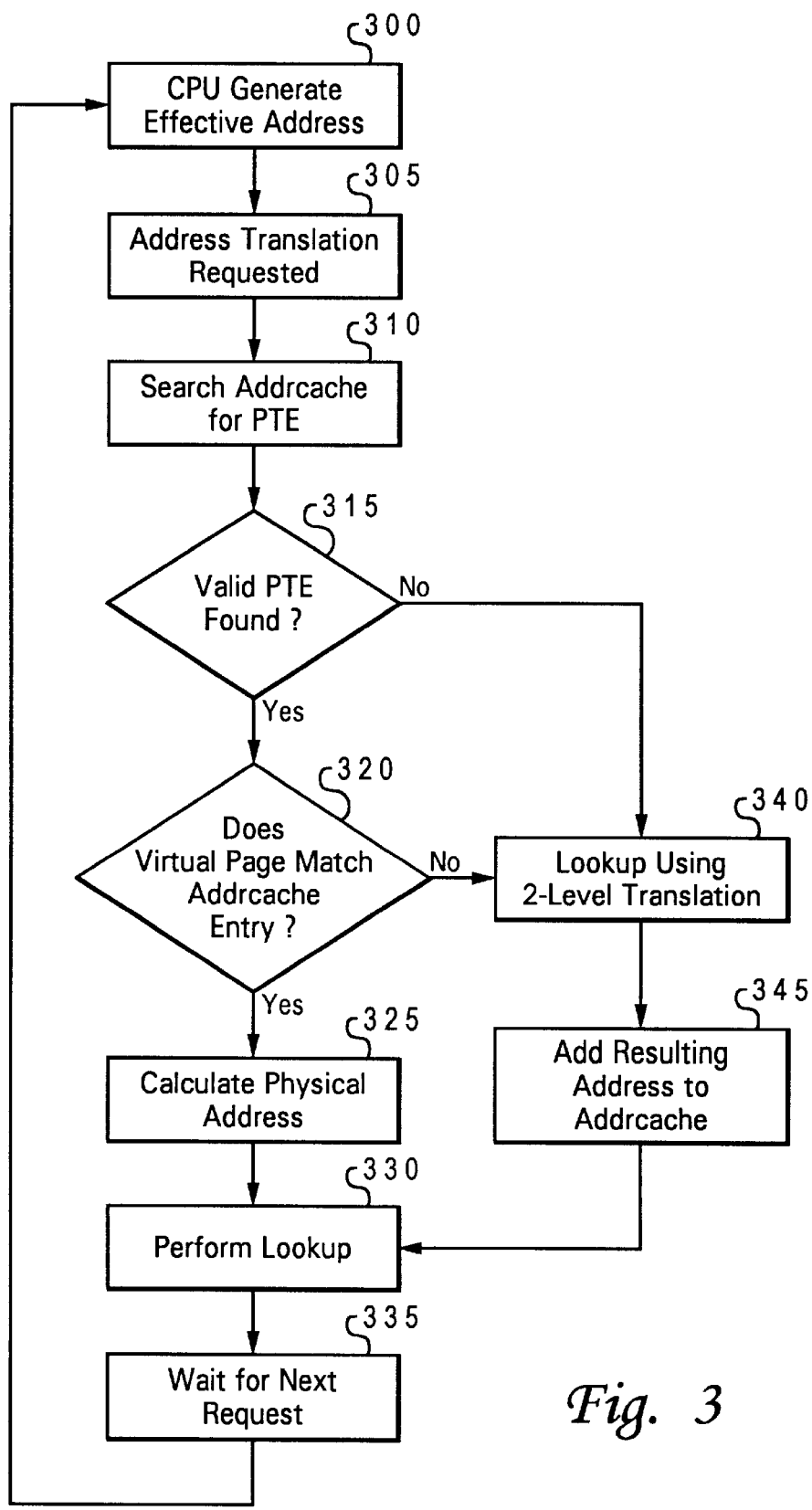
FIG. 3 is a flowchart of an address translation process in accordance with a preferred embodiment of the present invention.

Referring now to FIG. 3, a flowchart is shown which illustrates the typical use of the address cache in a computer system, in accordance with the preferred embodiment. The process begins when the CPU, executing some application, generates the effective address for a requested instruction or data (step 300). The CPU then requests the necessary address translation (step 305).

Next, the address cache (addrcache) is searched (step 310), based on effective address, for a pointer to a valid PTE. This search is performed in the respective data/instruction caches, according to the type of address required, using a conventional hash function.

If a valid PTE is not found (step 315) (and the matching pointer not been assigned ("NULL"), then the address is looked up using a conventional normal 2-level address translation process (step 340). The resulting entry is added to the addrcache for next time (step 345), to avoid requiring 2-level translation and the overhead of protection checking, if it is determined to be a safe entry (as defined above).

Figure 4:
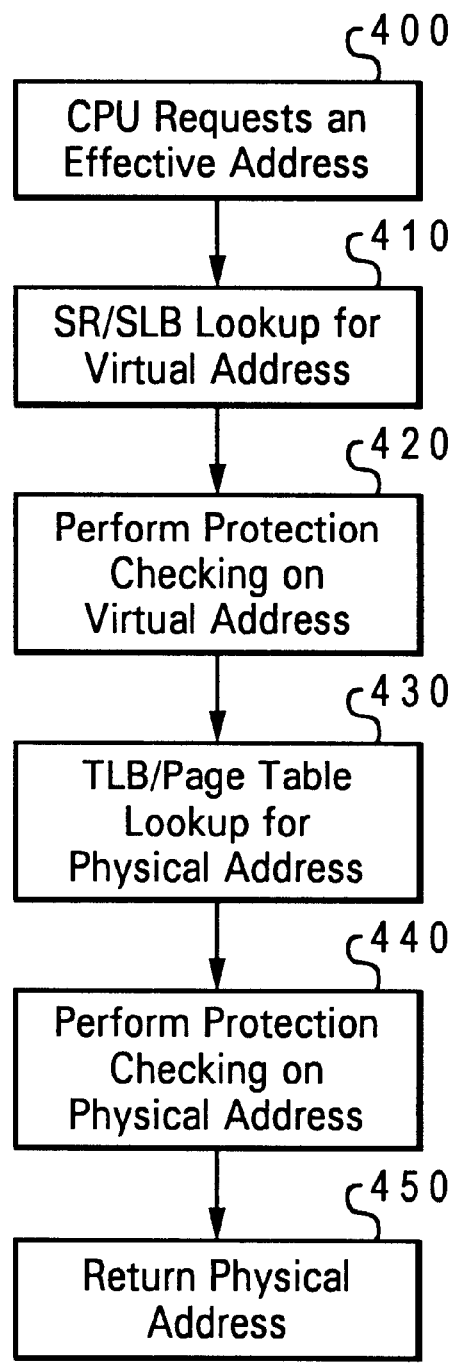
FIG. 4 is a flowchart of a conventional two-level address translation process.
Figure 5:
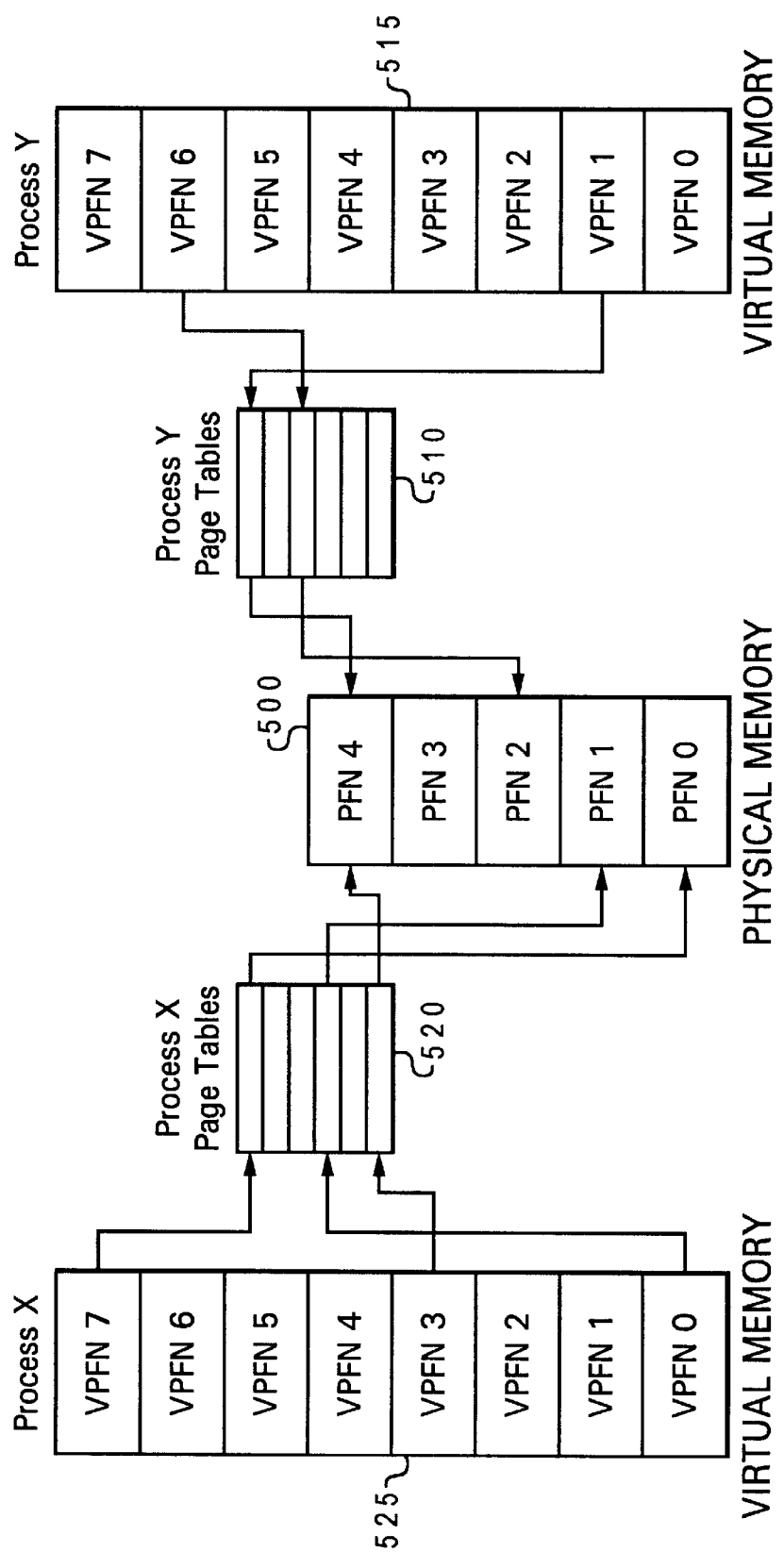
FIG. 5 depicts an exemplary block diagram of the use of page tables for address translation.

It should be noted that while, in this diagram, the two-level translation is shown as a single process, this depiction is for simplification. The address translation process of step 340 is a high-overhead, multiple-step process, as shown, e.g., in FIG. 4.

Otherwise, if a valid PTE is found (the pointer is not "NULL"), then the system checks to see if requested Virtual Page (VSID+Page) matches an addrcache entry (i.e. belongs to current process) (step 320). If VSID is not readily available in SR or SLB, go through the two-level address translation process (step 340). If VSID is available, then the virtual page match/check is completed.

After the lookup is performed, by whichever means, the system then calculates the physical address (step 325) and fetch the requested information from the memory subsystem (step 330). the memory system awaits the next address request, and repeats (step 335).

It is important to note that while the present invention has been described in the context of a fully functional data processing system and/or network, those skilled in the art will appreciate that the caching mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links. The preferred caching system can also be implemented in a dedicated cache memory closely associated with the processor or memory, or can be a dynamic addressing table in a conventional system memory.

While the invention has been particularly shown and described with reference to a preferred embodiment, it will be understood by those skilled in the art that various changes in form and detail may be made therein without departing from the spirit and scope of the invention.

What is claimed is:

1. A method for performing address translation in a computer system, said method comprising the steps of:
   translating a first vial address into a first physical address;
   protection checking said first physical address;
   storing, in an address cache memory, said protection checked first physical address corresponding to said first virtual address;
   requesting, from said address cache memory, a second physical address for a second virtual address;
   comparing said second physical address with said protection checked first physical address in said address cache memory; and
   returning said protection checked first physical address as the physical address of said second virtual address if said second physical address matches said first physical address.

2. The method of claim 1, further comprising:
   if said second physical address does not match said first physical address, then:
      protection checking said second physical address; and
      storing, in said address cache memory, said protection checked second physical address corresponding to said second virtual address.

3. A computer system comprising:
   means for translating a first virtual address into a first physical address;
   means for protection checking said first physical address;
   means for storing in an address cache memory, said protection checked first physical address corresponding to said first virtual address;
   means for requesting, from said address cache memory, a second physical address for a second virtual address;
   means for comparing said second physical address with said protection checked first physical address in said address cache memory; and
   means for returning said protection checked first physical address as the physical address of said second virtual address if said second physical address matches said first physical address.

4. The computer system of claim 3, wherein if said second physical address does not match said first physical address, then:
   means for protection checking said second physical address; and
   means for storing, in said address cache memory, said protection checked second physical address corresponding to said second virtual address.

5. A computer program product, residing on a computer usable medium, for performing address translation in a computer system, said computer program product comprising:
   program code means for translating a first virtual address into a first physical address;
   program code means for protection checking said first physical address; and
   program code mean for storing, in an address cache memory, said protection checked first physical address corresponding to said first virtual address;
   program code means for requesting, from said address cache memory, a second physical address for a second virtual address;
   program code means for comparing said second physical address with said protection checked first physical address in said address cache memory, and
   program code means for returning said protection checked first physical address as the physical address of said second virtual address if said second physical address matches said first physical address.

6. The computer program product of claim 5, wherein if said second physical address does not match said first physical address, then said computer program product further comprising:
   program code means for protection checking said second physical address; and
   program code means for storing, in said address cache memory, said protection checked second physical address corresponding to said second virtual address.

* * * * *